Figure 1:
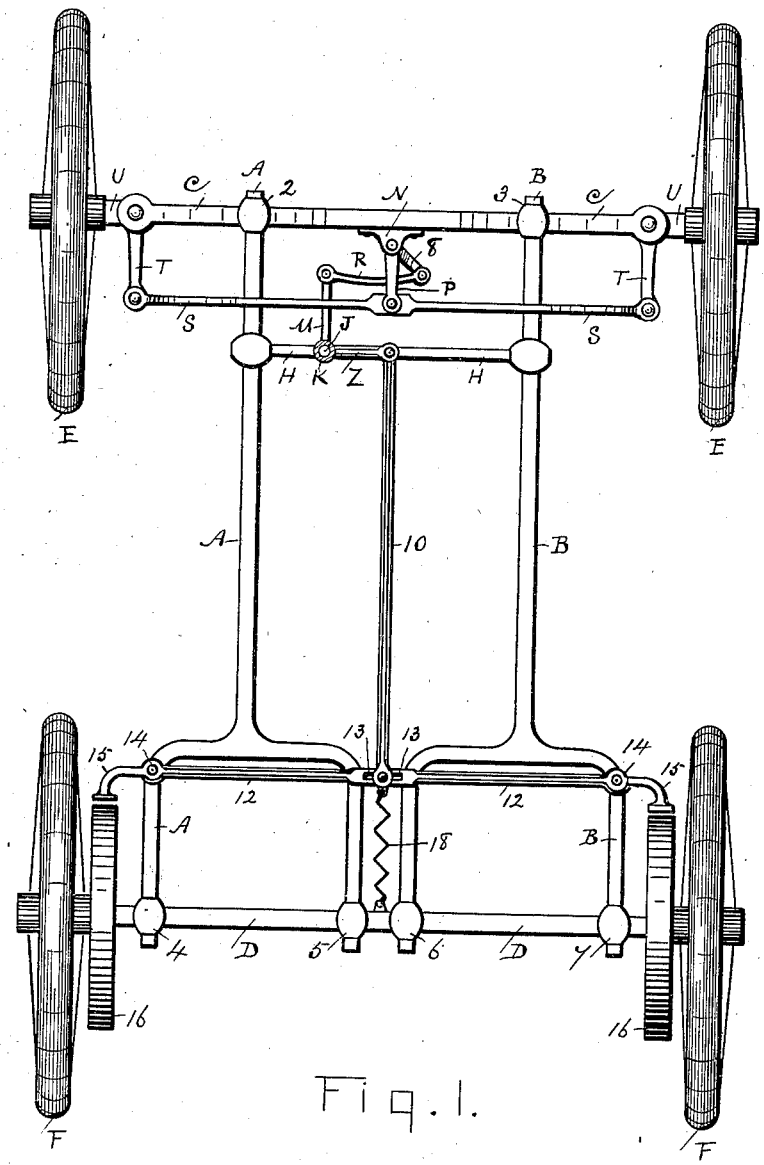

No. 662,475. Patented Nov. 27, 1900.
A. STRICKLAND.
STEERING AND BRAKE DEVICE FOR AUTOMOBILE CARRIAGES.
(Application filed Mar. 1, 1900.)
(No Model.) 2 Sheets—Sheet 2.
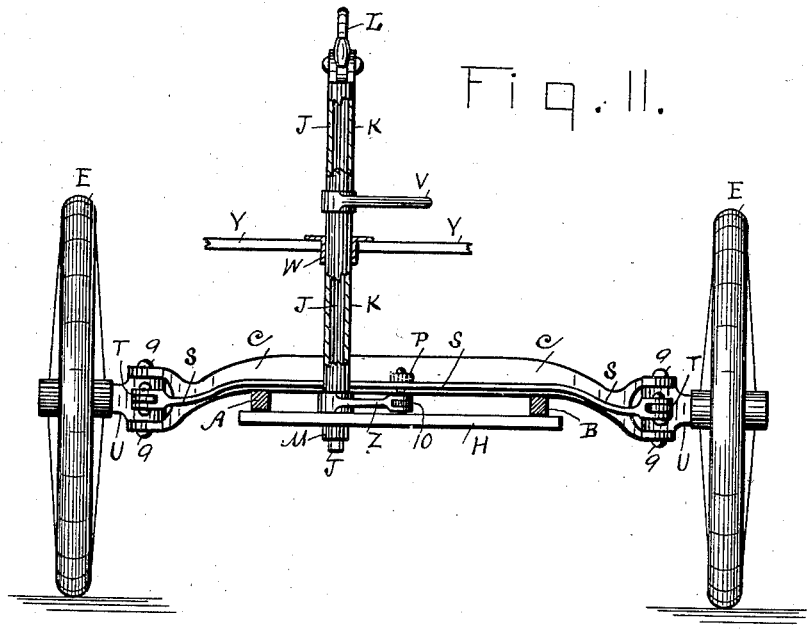
Fig. II.
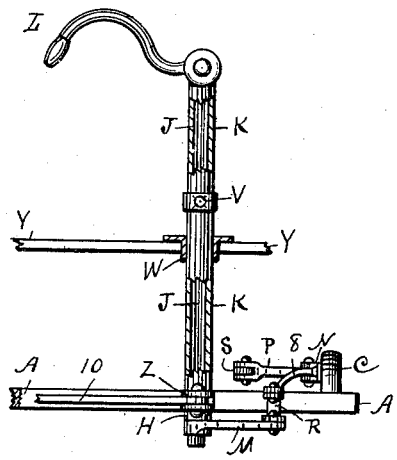
Fig. III.
Witnesses.
G. W. Cameron
John A. Leggatt
Inventor.
Arthur Strickland
By John K. Hendry, Atty.

UNITED STATES PATENT OFFICE.

ARTHUR STRICKLAND, OF HAMILTON, CANADA.

STEERING AND BRAKE DEVICE FOR AUTOMOBILE CARRIAGES.

SPECIFICATION forming part of Letters Patent No. 662,475, dated November 27, 1900.

Application filed March 1, 1900. Serial No. 6,961. (No model.)

*To all whom it may concern:*

Be it known that I, ARTHUR STRICKLAND, a citizen of Canada, residing at Hamilton, in the county of Wentworth, in the Province of Ontario, Canada, have invented new and useful Improvements in Steering and Brake Devices for Automobile Carriages, of which the following is a specification.

My invention relates to improvements in the steering and the braking of automobile carriages; and it comprises a system of levers and rods connected to each other and to the front axle and framework of an automobile carriage in such a manner that when the same is manipulated by hand perfect steering is accomplished, and when a part of the mechanism is operated by means of the foot the brake is applied to the rear ground-wheels through the medium of the outer face of the internal gear-wheels on the rear axle.

The objects of my invention are, first, to provide a most suitable and perfect steering device for automobile carriages, and, second, to afford facilities for the proper braking or retarding of the vehicle when necessary without interfering with the steering mechanism. I attain these objects by the mechanism illustrated in the accompanying drawings, in which—

Figure 1 is a plan of the lower metallic framework of the automobile attached to the front and rear axles thereof, the upper carriage or box part being removed to show the steering and brake mechanism connected to said metallic framework. Fig. 2 is an end elevation of the forward part of the steering and brake mechanism looking from the rear of the automobile, parts being in section; and Fig. 3 is a side elevation of the front part of said mechanism, the transverse steering-rods being removed, the brake-rod shown broken, and parts in section.

Similar characters refer to similar parts throughout the several views.

In the drawings the metallic framework of this automobile carriage is shown in two parts A and B and is connected to the front stationary axle C at 2 and at 3 and to the rear stationary axle D at 4, 5, 6, and 7. The front ground-wheels are indicated by E, and the rear ground drive-wheels by F. The forward parts of the frame A and B are connected by a transverse supporting-bar H, which is secured to the under side of said frame as a support and bearing for the vertical rod J, which extends through said support, and also a support for the vertical sleeve K around said rod. The upper end of this rod is supplied with a steering-handle L, which is capable of being turned over forwardly on its pivotal center to allow ingress and egress to the carriage. This rod, with its sleeve, is conveniently located in front of the seat of the carriage. The lower end of this rod J is provided with an arm M, which is secured to the rod and rotates with the same by means of said handle when moved sidewise. A pivotal bearing N is secured to the central part of the front axle C, and a crank P has pivotal connection to said bearing N. This crank is capable of horizontal movement by means of the curved rod R, which has pivotal connection to the forward end of the arm M and to the side and lower extension 8 of the crank P. The double rod S in a central part has pivotal connection to the crank P, and the two extreme ends of the rod S has pivotal connection to the projecting arms T, which are a rigid part of the hubs U of the front wheels E, which revolve loosely on sleeves or otherwise on their respective hubs. These hubs are pivoted to the ends of the front axle C at 9, respectively. In this steering mechanism, as described, it will be observed that when the steering-handle L is brought toward the right hand the lower secured arm M moves toward the left hand. Consequently the crank P moves in the same direction as the arm M and also the double rod S, which act upon the arms T, which guide the forward part of the wheels E to the right, and hence the automobile, and when the steering-handle is brought toward the left hand the wheels E are brought toward the left by means of the said mechanism. This pivotal connection of the front ground-wheels to the ends of the front axle of the automobile and the projecting arms T of the hubs or centers of said wheels I do not claim as new.

The braking of the automobile is accomplished by means of the foot-brake lever V, which is a part of the vertical sleeve K, which rests on the transverse bar H, previously referred to. This sleeve has a midway or upper bushing W, with an upper circular flange which is secured to the floor Y of the carriage. This bushing W is made in two semicircular parts to facilitate the insertion of the said sleeve with its inner vertical rod. The upper end of this sleeve may extend as far as the steering-handle L, or it may terminate at a place between said handle and the foot-brake lever V. The lower end of the sleeve has a lever-arm Z, which is a part of the sleeve and moves with the same when operated by the foot-brake. This foot-brake is located in a convenient place to suit the driver's foot, as is also the steering-handle located higher or lower to suit the driver's hand. This lower lever-arm Z of the sleeve is connected to the two rearwardly-located levers 12 by the medium of the connecting-rod 10, which is pivoted to said arm Z and to the levers 12. These levers have horizontally-slotted holes 13 at their connection with the rod 10 to facilitate their operation and are pivoted at 14 to the frame A and B. The ends of these levers 12 are suitably curved and bent, as at 15, to properly perform their function of engaging with the periphery of the internal gear-wheels 16, which are rigidly secured to the rear ground-wheels F. These wheels 16 are driven by suitable electric motors and storage batteries located in and on the rear widened-out part of the frame A and B. The particular gear-wheels and their connection with the rear ground-wheels and particular mechanism for driving of the same I do not claim. In respect to this brake device it will be perceived that when the upper foot-brake of the vertical sleeve is pushed forwardly the lower lever-arm Z of the sleeve is brought forward. Consequently the pivoted rod 10, with the inner ends of the levers 12 and the outer ends 15 of these levers, presses against the outer faces or peripheries of the internal gear-wheels 16 to brake or retard their motion, and hence the motion of the connected rear ground-wheels. A spiral tension-spring 18 is connected to the rear end of the rod 10 and to the rear axle D for the purpose of drawing said rod toward the axle to prevent engagement of the brakes 15 with the wheels 16 and to retain the foot-brake V in proper rearward position—that is, in position to be operated upon to push forwardly to brake.

When steering, by the least motion of the steering-handle to one side or to the other the front wheels are guided very easily and accurately with the least possible exertion, and also the braking is accomplished by the least foot exertion against the foot-brake V. The steering-handle L and the lower steering-arm M are both attached to and operate or rotate with the vertical rod J, and the foot-brake lever V, together with the lower lever Z, forms a part of the vertical sleeve K and operates or rotates, together with said sleeve, when the lever V is pushed and when the spring 18 performs its function, as set forth.

Various changes in the form, proportion, and minor details of my invention may be resorted to without departing from the spirit and scope thereof. Hence

What I claim as my invention, and desire to secure by Letters Patent, is—

1. The combination of a transverse bar secured to the framework of an automobile carriage, a vertical sleeve with inner steering-rod supported on said bar, a split bushing in the floor of the carriage for said sleeve, the steering-rod connected to arms T, by mechanism comprising transverse rods pivoted to said arms T, and to a crank pivoted to the front axle, an arm secured to the lower part of the vertical rod and a curved rod connecting said arm and crank by means of a lower side extension of said crank, for the purpose set forth.

2. The combination of a transverse bar secured to the framework of an automobile carriage, a vertical sleeve with inner steering-rod supported by said bar, a lower lever forming a part of the sleeve, transverse brake-rods pivoted at the outer parts of the rear part of said framework, rearwardly-curved ends as brakes to engage with the peripheries of the internal gear-wheels of the rear ground-wheels of the carriage, a rod connecting said lower lever to said transverse rods, slots in said rods to form said connection and to allow the rods to brake, a split bushing in the floor of the carriage for said sleeve and a foot-brake forming a part of the sleeve above the floor of the carriage, for the purpose set forth.

3. In an automobile carriage the steering and braking mechanism comprising a vertical rod with suitable handle, a vertical sleeve for said rod, the rod and sleeve capable of rotating independently and supported on a transverse bar of the metallic frame of the carriage and through a bushing in the carriage-floor, a forwardly-extending arm secured to the lower end of the rod, a rearwardly-extending crank pivoted to the front stationary axle, a rod pivoted to said arm and the other end of said rod pivotally connected to a lower side extension of said crank, transverse rods pivotally connected to the rearwardly-extending end of said crank, the outer ends of said rods pivotally connected to the projecting arms of the pivotally-connected hubs of the front wheels, combination with an upper foot-brake and a lower lever projecting from said sleeve, transverse rods pivotally connected to said frame, the outer ends of said rods curved to engage as brakes with the periphery of the internal gear-wheels connected to the rear ground-wheels, inner ends of said rods slotted and connected to the rear end of a central rod, the forward end of said rod pivotally connected to the lower lever of said sleeve and a spiral tension-spring connected to the rear end of said rod and to the rear axle of the carriage to disengage the brakes, as described.

ARTHUR STRICKLAND.

Witnesses:
JOHN H. HENDRY,
JOHN A. LEGGATT.